United States Patent
Lee

(10) Patent No.: US 9,606,547 B2
(45) Date of Patent: Mar. 28, 2017

(54) APPARATUS AND METHOD FOR CONTROLLING ACTUATOR IN CAMERA MODULE

(71) Applicant: Samsung Electronics Co. Ltd., Suwon-si, Gyeonggi-do (KR)

(72) Inventor: Yong-Gu Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 330 days.

(21) Appl. No.: 13/871,617

(22) Filed: Apr. 26, 2013

(65) Prior Publication Data

US 2013/0293179 A1    Nov. 7, 2013

(30) Foreign Application Priority Data

May 7, 2012   (KR) .................. 10-2012-0048013

(51) Int. Cl.
| | |
|---|---|
| *G05D 3/12* | (2006.01) |
| *G09G 5/00* | (2006.01) |
| *G03B 3/10* | (2006.01) |

(52) U.S. Cl.
CPC ........... *G05D 3/125* (2013.01); *H02P 25/034* (2016.02)

(58) Field of Classification Search
USPC ....................................................... 318/647
See application file for complete search history.

(56) References Cited

U.S. PATENT DOCUMENTS

| | | | | |
|---|---|---|---|---|
| 5,660,255 A | * | 8/1997 | Schubert ................ | E04B 1/985 188/378 |
| 5,823,307 A | * | 10/1998 | Schubert ................ | E04B 1/985 188/378 |
| 6,570,360 B1 | * | 5/2003 | Freeman ................. | H02P 6/182 318/798 |
| 7,589,920 B2 | * | 9/2009 | Shin ....................... | G02B 13/001 359/811 |
| 7,915,844 B2 | * | 3/2011 | Kurosawa .............. | G11B 19/28 318/400.4 |
| 8,084,969 B2 | * | 12/2011 | David ..................... | G01D 5/145 310/12.01 |

(Continued)

FOREIGN PATENT DOCUMENTS

| | | |
|---|---|---|
| CN | 200944308 Y | 9/2007 |
| CN | 101464611 A | 6/2009 |

(Continued)

*Primary Examiner* — Eduardo Colon Santana
*Assistant Examiner* — Said Bouziane
(74) *Attorney, Agent, or Firm* — Jefferson IP Law, LLP

(57) ABSTRACT

An apparatus for controlling an actuator in a camera module is provided. The apparatus includes a position controller for producing a control voltage to move a lens of the camera module, a hall sensor for detecting an amount of change in magnetic lines of force generated by a magnet as a hall voltage, a voice coil motor for moving the lens according to a current applied thereto, and a current controller for using a voltage applied to the voice coil motor to detect an interference voltage created by the current applied to the voice coil motor, for generating an interference-eliminated hall voltage by removing the interference voltage from the hall voltage, and for controlling the current applied to the voice coil motor based on the control voltage and the interference-eliminated hall voltage.

18 Claims, 9 Drawing Sheets

(56) References Cited

U.S. PATENT DOCUMENTS

| | | | | |
|---|---|---|---|---|
| 8,115,817 B2* | 2/2012 | Chen | ............... | G02B 27/646 348/208.1 |
| 8,320,753 B2* | 11/2012 | Lee | ............... | G03B 17/00 348/208.11 |
| 8,401,207 B2* | 3/2013 | Stanley | ............... | H03F 1/32 333/102 |
| 8,716,959 B2* | 5/2014 | David | ............... | G01D 5/145 318/135 |
| 8,958,689 B2* | 2/2015 | Saito | ............... | G02B 27/646 396/55 |
| 8,995,241 B1* | 3/2015 | Heo | ............... | G02B 7/023 359/557 |
| 2007/0188637 A1* | 8/2007 | Kawabe | ............... | H04N 3/1568 348/294 |
| 2007/0273364 A1* | 11/2007 | Takei | ............... | G02B 7/102 324/207.2 |
| 2008/0152332 A1 | 6/2008 | Koo et al. | | |
| 2009/0072773 A1* | 3/2009 | Kurosawa | ............... | G11B 19/28 318/400.04 |
| 2009/0085558 A1* | 4/2009 | David | ............... | G01D 5/145 324/207.2 |
| 2009/0160958 A1* | 6/2009 | Yamada et al. | ............... | 348/208.99 |
| 2009/0224716 A1* | 9/2009 | Vig et al. | ............... | 318/550 |
| 2009/0295978 A1* | 12/2009 | Yun | ............... | H04N 5/2251 348/335 |
| 2010/0182490 A1 | 7/2010 | Seol et al. | | |
| 2010/0245848 A1* | 9/2010 | Sakamoto | ............... | G03F 9/7088 356/620 |
| 2011/0228113 A1* | 9/2011 | Chen | ............... | G02B 27/646 348/208.5 |
| 2012/0014682 A1* | 1/2012 | David | ............... | G01D 5/145 396/133 |

FOREIGN PATENT DOCUMENTS

| | | |
|---|---|---|
| CN | 101884166 A | 11/2010 |
| KR | 10-0819301 B1 | 4/2008 |
| KR | 10-0849580 | 7/2008 |
| KR | 10-0880672 | 2/2009 |
| KR | 10-2010-0082829 | 7/2010 |

* cited by examiner

APPARATUS AND METHOD FOR CONTROLLING ACTUATOR IN CAMERA MODULE

PRIORITY

This application claims the benefit under 35 U.S.C. §119(a) of a Korean patent application filed on May 7, 2012 in the Korean Intellectual Property Office and assigned Serial No. 10-2012-0048013, the entire disclosure of which is incorporated herein by reference.

BACKGROUND OF THE INVENTION

1. Field of the Invention

The present invention relates to camera modules. More particularly, the present invention relates to an apparatus and method for controlling an actuator in a camera module.

2. Description of the Related Art

Rapid development of cameras in portable terminals has accelerated development of a technique for photographing images more quickly and exactly. A camera module includes an actuator for moving a lens. The actuator moves the lens taking into account the same control parameters based on the portable terminal's position and its surroundings, which, however, results in inaccuracy of the lens control. Due to the inaccuracy, when performing autofocus, a camera module has difficulty controlling the lens at high speed if the lens is moving to adjust focus.

Therefore, there is a need for a technique for precisely moving the lens position independently of the portable terminal's position and its surroundings.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for precisely controlling a camera module by removing a voltage generated under the influence of a current applied to a voice coil motor from a hall voltage detected by a hall sensor.

In accordance with an aspect of the present invention, an apparatus for controlling an actuator in a camera module is provided. The apparatus includes a position controller for producing a control voltage to move a lens of the camera module, a hall sensor for detecting an amount of change in magnetic lines of force generated by a magnet as a hall voltage, a voice coil motor for moving the lens according to a current applied thereto, and a current controller for using a voltage applied to the voice coil motor to detect an interference voltage created by the current applied to the voice coil motor, for generating an interference-eliminated hall voltage by removing the interference voltage from the hall voltage, and for controlling the current applied to the voice coil motor based on the control voltage and the interference-eliminated hall voltage.

The current controller may include a resistor for converting the current applied to the voice coil motor into a voltage, a first OPerational Amplifier (OP Amp) for using the voltage to detect the interference voltage generated under the influence of the current applied to the voice coil motor, a second OP Amp for generating the interference-eliminated hall voltage by removing the influence voltage from the hall voltage, a third OP Amp for generating a moving voltage to control the current applied to the voice coil motor based on the interference-eliminated hall voltage and the control voltage, and a current booster for applying a current to the voice coil motor according to the moving voltage.

The current controller may include a resistor for converting the current applied to the voice coil motor into a voltage, a differential amplifier for detecting a voltage across the resistor, a first OP Amp for using the detected voltage to detect the interference voltage generated under the influence of the current applied to the voice coil motor, a second OP Amp for generating the interference-eliminated hall voltage by removing the influence voltage from the hall voltage, a third OP Amp for generating a moving voltage to control the current applied to the voice coil motor based on the interference-eliminated hall voltage and the control voltage, and a current booster for generating the current applied to the voice coil motor according to the moving voltage. Here, the differential amplifier may detect a polarity of the voltage across the resistor.

The current controller may include a resistor for converting the current applied to the voice coil motor into a voltage, a differential amplifier for detecting a voltage across the resistor, a first OP Amp for using the detected voltage to detect the interference voltage generated under the influence of the current applied to the voice coil motor, a second OP Amp for generating the interference-eliminated hall voltage by removing the influence voltage from the hall voltage, a third OP Amp for generating a moving voltage to control the current applied to the voice coil motor based on the interference-eliminated hall voltage and the control voltage, a Pulse Width Modulation (PWM) modulator for modulating the amplitude of the moving voltage, and a current booster for generating the current applied to the voice coil motor according to the modulated moving voltage. Here, the differential amplifier may detect a polarity of the voltage across the resistor.

The current controller may include a resistor for converting the current applied to the voice coil motor into a voltage, a differential amplifier for detecting a voltage across the resistor, an Analog-to-Digital Converter (ADC) for converting the detected voltage and the hall voltage to digital signals, respectively, and outputting the converted detected voltage and the converted hall voltage, a Digital Signal Processing (DSP) filter engine for generating a moving voltage to control the current applied to the voice coil motor based on the converted detected voltage and the converted hall voltage, and a current booster for generating the current applied to the voice coil motor according to the moving voltage. Here, the differential amplifier may detect a polarity of the voltage across the resistor.

The position controller may produce the control voltage to move the lens of the camera module based on a table of initial voltages to move the lens of the camera module and control voltages to move the lens of the camera module up to predetermined distances.

In accordance with another aspect of the present invention, a method for controlling an actuator in a camera module is provided. The method includes producing a control voltage to move a lens of the camera module, detecting an amount of change in magnetic lines of force generated by a magnet as a hall voltage, based on a voltage applied to a voice coil motor, detecting an interference voltage created by a current applied to the voice coil motor, generating an interference-eliminated hall voltage by removing the influence voltage from the hall voltage, based on the control voltage and the interference-eliminated hall voltage, controlling the current applied to the voice coil motor, and moving the lens according to the applied current.

The controlling of the current includes converting the current applied to the voice coil motor into a voltage, using the voltage to detect the interference voltage generated under the influence of the current applied to the voice coil motor, generating the interference-eliminated hall voltage by removing the influence voltage from the hall voltage, generating a moving voltage to control the current applied to the voice coil motor based on the interference-eliminated hall voltage and the control voltage, and applying a current to the voice coil motor according to the moving voltage. Here, the detecting of the voltage applied across the resistor may comprise detecting a polarity of the voltage across the resistor.

The controlling of the current includes detecting a voltage applied across a resistor, using the detected voltage to detect the interference voltage generated under the influence of the current applied to the voice coil motor, generating the interference-eliminated hall voltage by removing the influence voltage from the hall voltage, generating a moving voltage to control the current applied to the voice coil motor based on the interference-eliminated hall voltage and the control voltage, and applying a current to the voice coil motor according to the moving voltage. Here, the detecting of the voltage applied across the resistor may comprise detecting a polarity of the voltage across the resistor.

The controlling of the current includes detecting a voltage applied across a resistor, using the detected voltage to detect the interference voltage generated under the influence of the current applied to the voice coil motor, generating the interference-eliminated hall voltage by removing the influence voltage from the hall voltage, generating a moving voltage to control the current applied to the voice coil motor based on the interference-eliminated hall voltage and the control voltage, modulating the amplitude of the moving voltage, and applying a current to the voice coil motor according to the modulated moving voltage. Here, the detecting of the voltage applied across the resistor may comprise detecting a polarity of the voltage across the resistor.

The controlling of the current includes detecting a voltage applied across a resistor, converting the detected voltage and the hall voltage into digital signals, respectively, and outputting the converted detected voltage and the converted hall voltage, generating a moving voltage to control the current applied to the voice coil motor based on the converted detected voltage and the converted hall voltage, and applying a current to the voice coil motor according to the moving voltage. Here, the detecting of the voltage applied across the resistor may comprise detecting a polarity of the voltage across the resistor.

The control voltage to move the lens of the camera module may be produced based on a table of initial voltages to move the lens of the camera module and control voltages to move the lens of the camera module up to predetermined distances.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures

DETAILED DESCRIPTION OF EXEMPLARY EMBODIMENTS

The following description with reference to the drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted to for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A camera module according to exemplary embodiments of the present invention may be comprised in a portable terminal. The portable terminal is a mobile electronic device that is may be carried by humans, and may include video phones, cellular phones, smart phones, International Mobile Telecommunication-2000 (IM-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Books, portable computers (e.g., laptops, tablet Personal Computers (PCs), etc.), digital cameras, etc.

Figure 1:
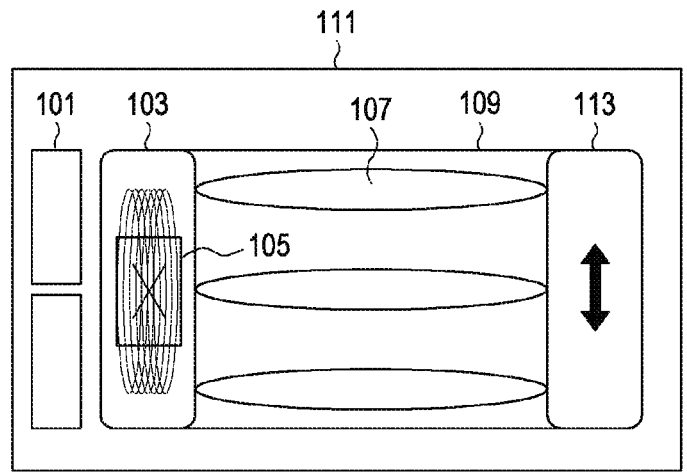
FIG. 1 is a diagram of a structure of an actuator according to an exemplary embodiment of the present invention.

FIG. 1 is a diagram of a structure of a actuator according to an exemplary embodiment of the present invention.

Referring to FIG. 1, an actuator 111 includes a magnet 101 and an actuation unit 109.

The magnet 101 is stationary, generates a magnetic field, and emits magnetic lines of force of the magnetic field toward the actuation unit 109. The actuation unit 109 is movable, determines a moving distance based on the amount of current applied to a Voice Coil Motor (VCM) 103, and moves a lens 107 in a predetermined movement direction 113 according to the moving distance.

The actuation unit 109 includes the VCM 103, the lens 107, and a hall sensor 105. The hall sensor 105 measures a change in the magnetic lines of force, generated by the magnet 101, and outputs a voltage for a measured current (produced by the change in the magnetic lines of force). The VCM 103 outputs a voltage to move the lens 107 based on the current applied thereto and the voltage output from the hall sensor 105, and moves the lens 107 according to the voltage.

Although an integration of the VCM 103 and the actuation unit 109 where the VCM 103 is integrated into the actuation unit 109 is shown in FIG. 1, another integration of the magnet 101 and the actuation unit 109 where the magnet 101 is integrated into the actuation unit 109 may be implemented.

Figure 2:
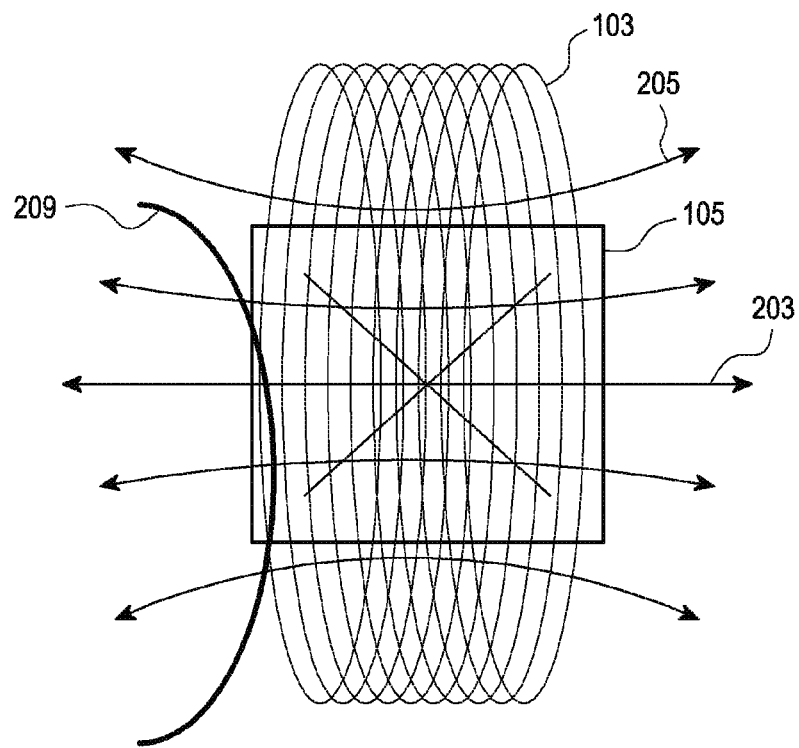
FIG. 2 shows magnetic lines of force of a Voice Coil Motor (VCM) according to an exemplary embodiment of the present invention.

FIG. 2 shows magnetic lines of force of a VCM according to an exemplary embodiment of the present invention.

Referring to FIG. 2, magnetic lines of force 203 and 205 may be present when current is applied to VCM 103. The magnetic line of force 203 is shown to be perpendicular to a plane in which the VCM 207 is configured, and the magnetic line of force 205 is shown not to be perpendicular to the plane.

The hall sensor 105 may detect the magnitude of measurable magnetic line of force from among the magnetic line of force 209 generated by the magnet 101 and the magnetic lines of force 203 and 205 generated by a coil of the VCM 103. The VCM 103 uses a change in the magnitude of the magnetic lines of force measured by the hall sensor 105 in response to a movement of the magnet 101, to control the movement of the actuation unit 109. However, since the change in the current applied to the VCM 103 causes a change in the magnitude of the magnetic lines of force 203 and 205, and the changed magnetic lines of force 203 and 205 overlap with the magnetic line of force 209 generated by the magnet 101, the movement of the actuation unit 109 is influenced not only by the magnet 101 but also by a change in the current applied to the VCM 103. The influence might make the movement of the actuation unit 109 inaccurate.

Figure 3:
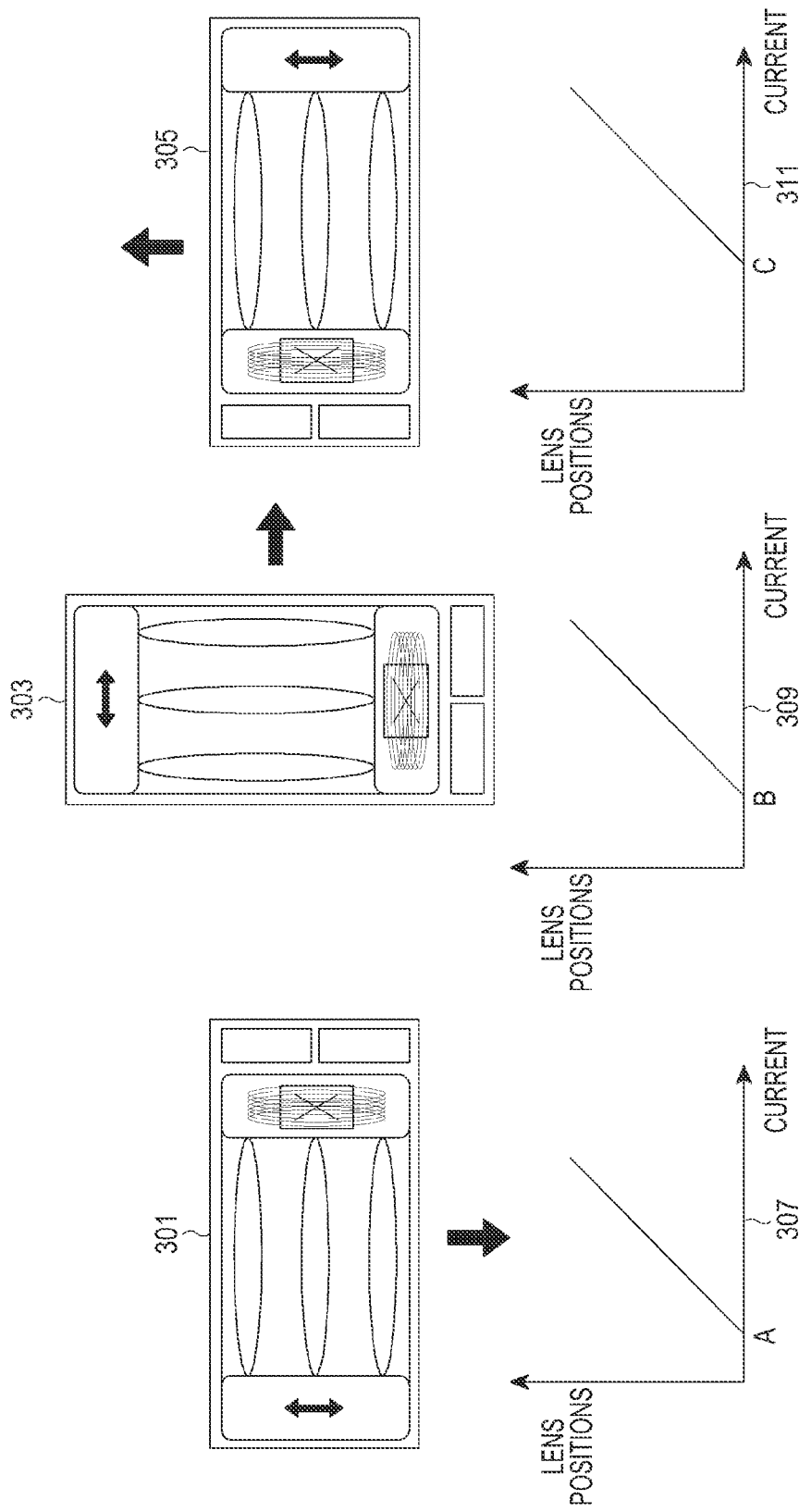
FIG. 3 shows changes in a current of a VCM based on positions of a camera module according to an exemplary embodiment of the present invention.

FIG. 3 shows changes in current of a VCM based on movements of a camera module according to an exemplary embodiment of the present invention.

Referring to FIG. 3, an image 301 illustrates the driving of a camera module while the magnet 101 and the actuation unit 109 are positioned downward, an image 303 illustrates the driving of the camera module while the magnet 101 and the actuation unit 109 are positioned horizontally, and an image 305 illustrates the driving of the camera module while the magnet 101 and the actuation unit 109 are positioned upward.

A graph 307 represents a change in the current of the VCM while the camera module is driven as in the image 301, a graph 309 represents a change in the current of the voice coil motor while the camera module is driven as in the image 303, and a graph 311 represents a change in the current of a coil of the VCM 103 while the camera module is driven as in the image 305.

Comparing graphs 307, 309, and 311, since the amount of current applied to the coil changes depending on driving positions of the camera module, initial current values A, B, and C of the graphs 307, 309, and 311, respectively, are different. Such a difference in initial current values is because the effective weight and effect of gravity of the actuation unit 109 changes depending on the driving position, thus leading to a change of current to move the actuation unit 109.

Figure 4:
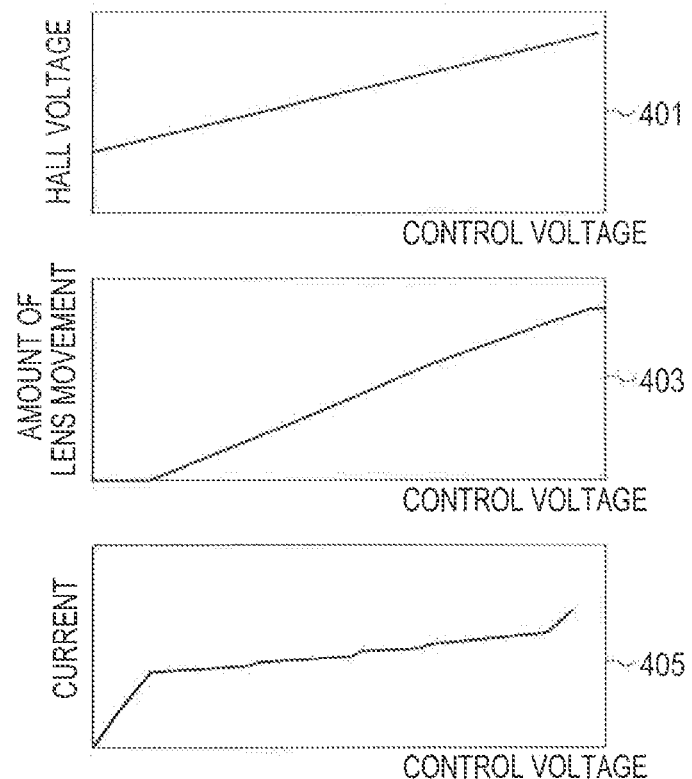
FIG. 4 shows graphs representing voltages of a hall sensor, amounts of lens movement, and currents of a VCM, respectively, corresponding to positions of a camera module according to an exemplary embodiment of the present invention.

FIG. 4 shows graphs representing voltage of a hall sensor, an amount of lens movement, and current of a VCM, respectively, according to an exemplary embodiment of the present invention.

Referring to FIG. 4, a graph 401 represents hall voltages output from the hall sensor 105 according to the position of the lens 107 contained in the camera module, and a graph 403 represents the amount of movement of the lens 107 according to the position of the lens 107, and a graph 405 represents the current applied to the VCM 103 according to the position of the lens 107.

From the graphs 401, 403, and 405, it can be seen that the hall voltage changes linearly while the amount of movement of the lens 107 and the current applied to the VCM 103 change nonlinearly.

Thus, a technique in which movement of the actuation unit 109 is precisely controlled by removing a voltage based on the current applied to the coil of the VCM 103 from the hall voltage output from the hall sensor 105 may be employed.

Figure 5:
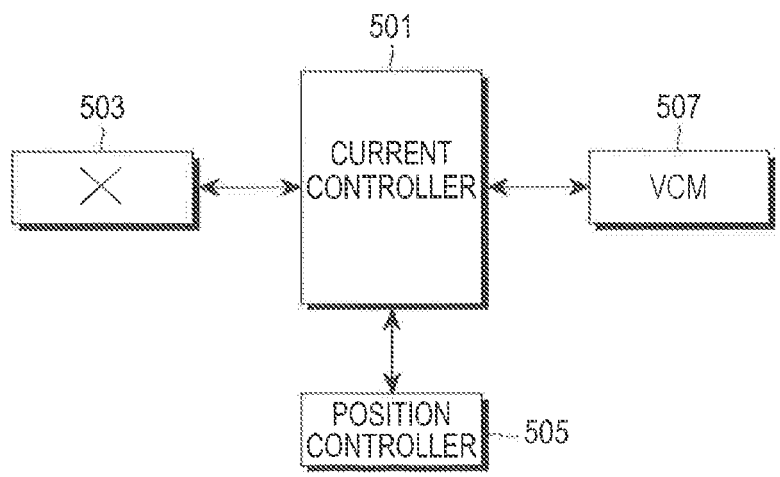
FIG. 5 is a block diagram of an actuator according to an exemplary embodiment of the present invention.

FIG. 5 is a block diagram of an actuator according to an exemplary embodiment of the present invention.

Referring to FIG. 5, the actuator includes a current controller 501, a hall sensor 503, a position controller 505, and a VCM 507.

The position controller 505 outputs a control voltage for controlling the position of the lens 107. The hall sensor 503 measures a change in magnetic lines of force generated by the magnet 101, and outputs a hall voltage for a measured amount of the current (produced by the change in magnetic lines of force). An interference voltage is now introduced to represent the voltage generated under the influence of the current applied to the VCM 507.

The current controller 501 detects the interference voltage from the current applied to the VCM 507, produces an interference-eliminated hall voltage by removing the detected interference voltage from the hall voltage output from the hall sensor 503, determines a moving voltage to move the lens 107 based on the produced interference-eliminated hall voltage and the control voltage output from the position controller 505, and moves the lens 107 of the actuation unit 109 according to the determined moving voltage. The interference-eliminated hall voltage refers to a voltage obtained by eliminating the influence of the current applied to the VCM 507 from the hall voltage.

Figure 6:
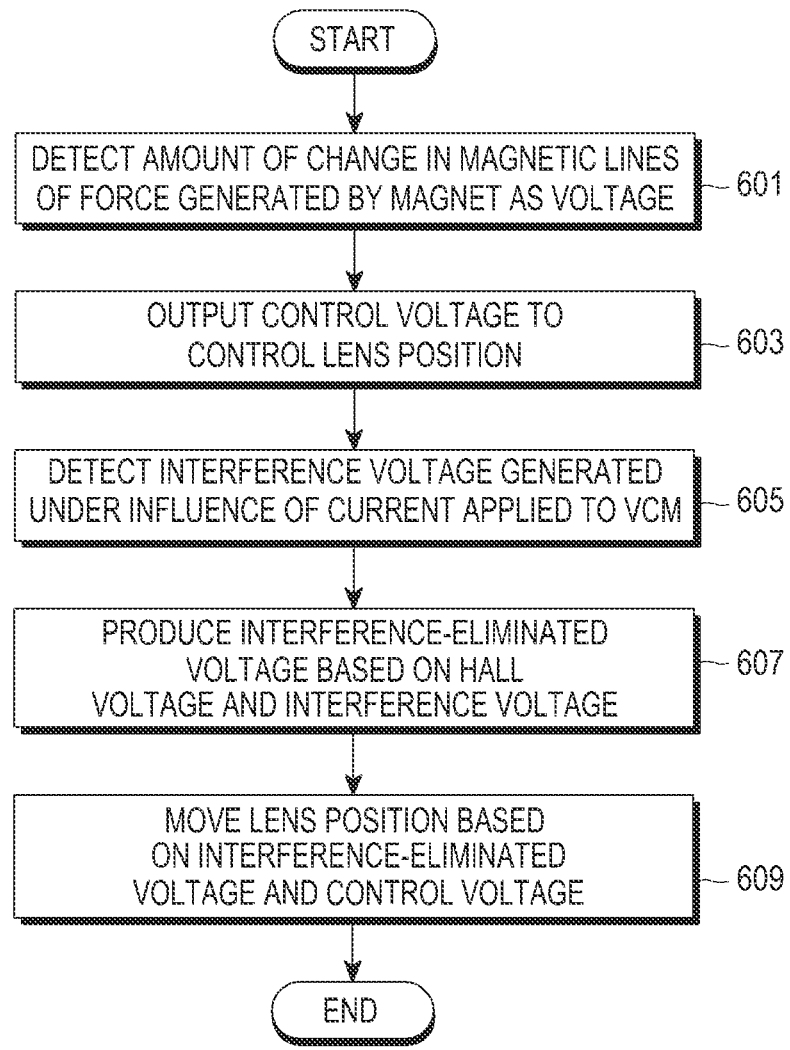
FIG. 6 is a flowchart of controlling a driver of an actuator according to an exemplary embodiment of the present invention.

FIG. 6 is a flowchart of controlling a driver in an actuator according to an exemplary embodiment of the present invention.

Referring to FIG. 6, the actuator detects an amount of change in the magnetic lines of force generated by the magnet 101 as the hall voltage, in step 601, and proceeds to step 603. In step 603, the actuator outputs the control voltage to control the position of the lens 107, and proceeds to step 605. In step 605, the actuator detects the interference voltage generated under the influence of the current applied to the VCM 507, and proceeds to step 607.

In step 607, the actuator produces the interference-eliminated hall voltage based on the detected hall voltage and the detected interference voltage, and proceeds to step 609. The interference-eliminated hall voltage refers to a voltage obtained by eliminating the influence of the current applied to the VCM 507 from the hall voltage. In step 609, the actuator moves the position of the lens 107 based on the interference-eliminated hall voltage and the control voltage. In this regard, the actuator determines the moving voltage to move the lens 107 based on the interference-eliminated hall voltage and the control voltage, and then moves the lens 107 according to the moving voltage.

Figure 7:
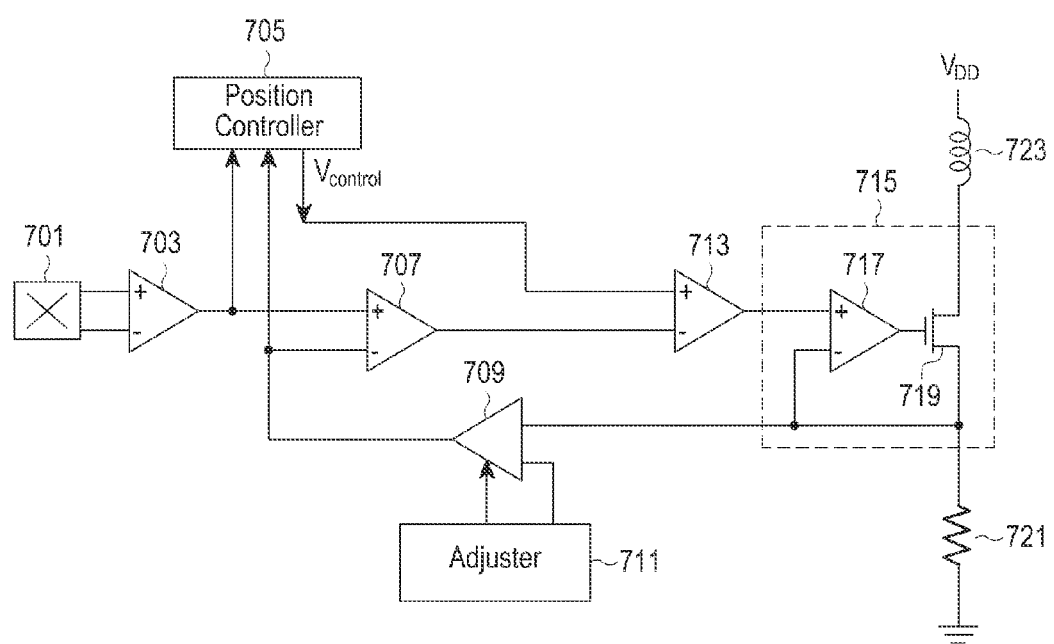
FIG. 7 is a circuit diagram of a current controller according to a first exemplary embodiment of the present invention.

FIG. 7 is a circuit diagram of a current controller according to a first exemplary embodiment of the present invention, where a current controller 501 uses a single-source current control scheme.

Referring to FIG. 7, the current controller 501 includes a hall sensor 701, a first OPerational Amplifier (OP Amp) 703, a position controller 705, a second OP Amp 707, a third OP Amp 709, an adjuster 711 for the third OP Amp 709, a fourth OP Amp 713, a current booster 715, a coil 723 of the VCM 507, and a resistor 721.

A current obtained by controlling the current booster 715 is applied to the coil 723 of the VCM 507, which in turn moves the actuation unit 109 based on the current. The current booster 715 adjusts the current to be applied to the coil 723 and outputs the adjusted current to the resistor 721. For example, the current booster 715 adjusts the movement of the lens 107 by adjusting the current to be applied to the coil 723 according to the moving voltage output from the fourth OP Amp 713. The current booster 715 includes a fifth OP Amp 717 and a Field Effect Transistor (FET) 719. On the other hand, the FET 719 may be substituted with a another type of transistor.

The current output from the current booster 715 flows through the resistor 721, and the voltage across the resistor 721 is output to an input of the third OP Amp 709. The adjuster 711 for the third OP Amp 709 adjusts offset, gain, and voltage polarity of the third OP Amp 709. Under the control of the adjuster 711 for the third OP Amp 709, the third OP Amp 709 adjusts the voltage across the resistor 721 to detect the interference voltage and outputs the interference voltage to an input of the second OP Amp 707. The interference voltage represents the voltage generated under the influence of the current applied to the VCM 507.

The hall sensor 701 detects the amount of change in the magnetic lines of force generated by the magnet 101 as the hall voltage, and outputs the hall voltage to the first OP Amp 703. The first OP Amp 703 then amplifies the hall voltage output from the hall sensor 701 according to a predetermined gain and outputs the amplified voltage to the second OP Amp 707.

Then, the second OP Amp 707 detects the interference-eliminated hall voltage based on the interference voltage output from the third OP Amp 709 and the hall voltage output from the first OP Amp 703, and outputs the interference-eliminated hall voltage to the fourth amplifier 713. The interference-eliminated hall voltage refers to a voltage obtained by eliminating the influence of the current applied to the VCM 507 from the hall voltage.

The position controller 705 outputs the control voltage to control the position of the lens 107 to the fourth OP Amp 713. The fourth OP Amp 713 then determines the moving voltage to move the lens 107 based on the interference-eliminated hall voltage output from the second OP Amp 707 and the control voltage output from the position controller 705, and outputs the moving voltage to the current booster 715.

Again, the position controller 705 receives the hall voltage output from the first OP Amp 703 and the interference voltage output from the third OP Amp 709, digitizes the hall voltage and the interference voltage with an Analog to Digital Converter (ADC) (not shown), and monitors values of the digitized hall voltage and interference voltage.

The position controller 705 also stores the control voltage for the position of the actuation unit 109 in a memory (not shown), determines a control voltage for the moving distance based on the control voltage for the position of the actuation unit 109, and outputs the determined control voltage. For example, the position controller 705 stores a table of initial voltages (e.g., represented by 'A' in FIG. 3) to move the actuation unit 109 and control voltages to move the actuation unit 109 up to predetermined distances, and determines one control voltage based on the table.

Figure 8:
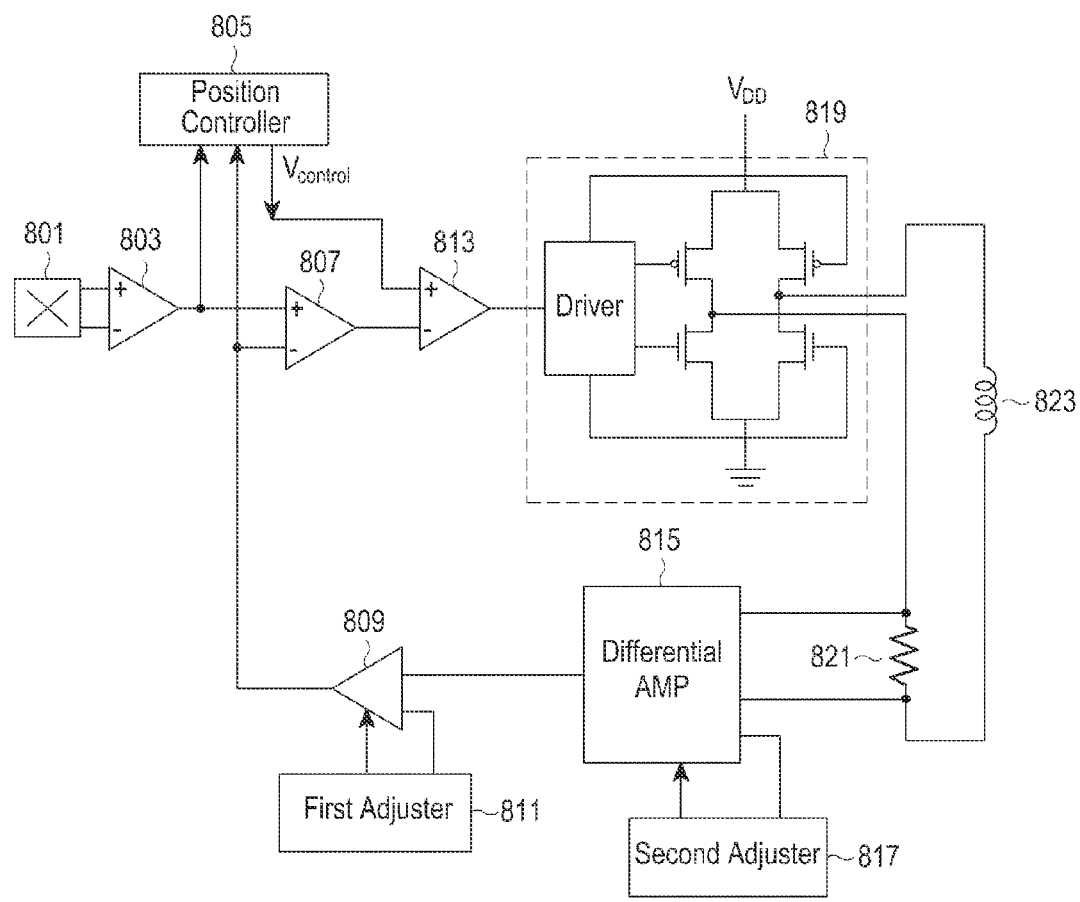
FIG. 8 is a circuit diagram of a current controller according to a second exemplary embodiment of the present invention.

FIG. 8 is a circuit diagram of a current controller according to a second exemplary embodiment of the present invention, where the current controller uses a bidirectional current control scheme.

Referring to FIG. 8, the current controller 501 includes a hall sensor 801, a first OP Amp 803, a position controller 805, a second OP Amp 807, a third OP Amp 809, a first adjuster 811 for the third OP Amp 809, a fourth OP Amp 813, a current booster 819, a coil 823 of the VCM 507, a resistor 821, a differential amplifier 815, and a second adjuster 817 for the differential amplifier 815.

A current from the current booster 819 is applied to the coil 823 of the VCM 507, which in turn moves the actuation unit 109 based on the current.

The current booster 819 adjusts the current to be applied to the coil 823 and outputs the adjusted current to the resistor 821. For example, the current booster 819 adjusts the movement of the lens 107 by adjusting the current to be applied to the coil 823 according to the moving voltage output from the fourth OP Amp 813. The current booster 819 includes four FETs and a driver. Alternatively, the FETs may be substituted with other types of transistors.

The current output from the current booster 819 flows through the resistor 821, and the voltage across the resistor 821 is output to an input of the differential amplifier 815. The second adjuster 817 for the differential amplifier 815 adjusts offset, gain, and voltage polarity of the differential amplifier 815, and the differential amplifier 815 amplifies the voltage across the resistor 821 under the control of the second adjuster 817 for the differential amplifier 815, and outputs the amplified voltage to an input of the third OP Amp 809. As shown in FIG. 8 where the bidirectional current control scheme is employed, the voltage applied across the resistor 821 has a polarity of either positive (+) or negative (−) depending on a current direction, and the differential amplifier 815 is used to detect the polarity of the voltage applied across the resistor 821.

The first adjuster 811 for the third OP Amp 809 adjusts offset, gain, and polarity of the third OP Amp 809. Under the control of the first adjuster 811 for the third OP Amp 809, the third OP Amp 809 adjusts the voltage output from the differential amplifier 815 to detect the interference voltage, and outputs the interference voltage to an input of the second OP Amp 807. The interference voltage represents the voltage generated under the influence of the current applied to the VCM 507.

The hall sensor 801 detects the amount of change in the magnetic lines of force generated by the magnet 101 as the hall voltage, and outputs the hall voltage to the first OP Amp 803. The first OP Amp 803 then amplifies the hall voltage output from the hall sensor 801 according to a predetermined gain and outputs the amplified hall voltage to the second OP Amp 807.

Then, the second OP Amp 807 detects the interference-eliminated hall voltage based on the interference voltage output from the third OP Amp 809 and the hall voltage output from the first OP Amp 803, and outputs the interference-eliminated hall voltage to the fourth amplifier 813. The interference-eliminated hall voltage refers to a voltage obtained by eliminating the influence of the current applied to the VCM 507 from the hall voltage.

The position controller 805 outputs the control voltage to control the position of the lens 107 to the fourth OP Amp 813. The fourth OP Amp 813 then determines the moving voltage to move the lens 107 based on the interference-eliminated hall voltage output from the second OP Amp 807 and the control voltage output from the position controller 805, and outputs the moving voltage to the current booster 819.

Again, the position controller 805 receives the hall voltage output from the first OP Amp 803 and the interference voltage output from the third OP Amp 809, digitizes the hall voltage and the interference voltage with an ADC (not shown), and monitors values of the digitized hall voltage and interference voltage.

The position controller 805 also stores the control voltage for the position of the actuation unit 109 in a memory (not shown), determines a control voltage for the moving distance based on the control voltage for the position of the actuation unit 109, and outputs the determined control voltage. For example, the position controller 805 stores a table of initial voltages (e.g., represented by 'A' in FIG. 3) to move the actuation unit 109 and control voltages to move the actuation unit 109 up to predetermined distances, and determines one control voltage based on the table.

The differential amplifier 815 will be described in more detail with reference to FIG. 9.

Figure 9:
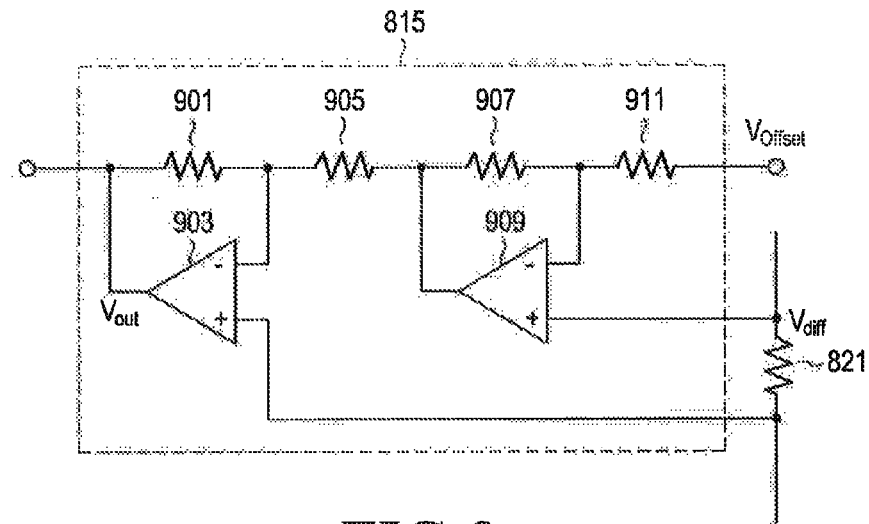
FIG. 9 is a circuit diagram of a differential amplifier according to the second exemplary embodiment of the present invention.

Referring to FIG. 9, the differential amplifier 815 includes first to fourth resistors 901, 905, 907, and 911 and first and second OP Amps 903 and 909.

The second OP Amp 909 generates an output voltage based on a voltage $V_{diff}$ applied across a resistor 821 and an offset voltage $V_{offset}$ output from the second adjuster 817 for the differential amplifier 815, and outputs the generated output voltage $V_{out}$ to the first OP Amp 903.

If the resistance of the first and fourth resistors is the same and the resistance of the second and third resistors is the same, the output voltage $V_{out}$ may be expressed in the following Equation (1).

$$V_{out} = V_{diff} \times \left(\frac{R_1}{R_2}\right) + V_{offset} \qquad \text{Equation (1)}$$

where, $V_{out}$ represents the output voltage of the second OP Amp 909, $V_{diff}$ represents the voltage applied across the resistor 821, and $V_{offset}$ represents the offset voltage output from the second adjuster 817 for the differential amplifier 815. $R_1$ represents the resistance of the first and fourth resistors and $R_2$ represents the resistance of the second and third resistors.

Figure 10:
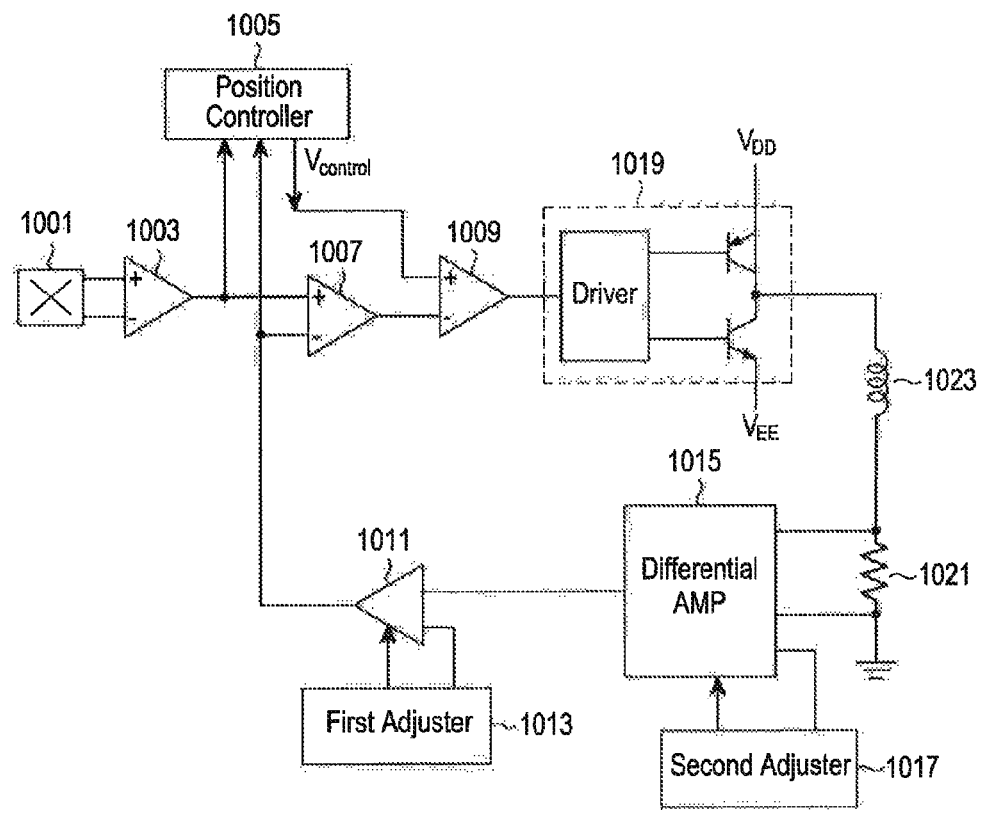
FIG. 10 is a circuit diagram of a current controller according to a third exemplary embodiment of the present invention.

FIG. 10 is a circuit diagram of a current controller according to a third exemplary embodiment of the present invention.

Referring to FIG. 10, the current controller 501 employs a +/− dual power source. Referring to FIG. 10, the current controller 501 includes a hall sensor 1001, a first OP Amp 1003, a position controller 1005, a second OP Amp 1007, a third OP Amp 1011, an first adjuster 1013 for the third OP Amp 1011, a fourth OP Amp 1009, a current booster 1019, a coil 1023 of the VCM 507, a resistor 1021, a differential amplifier 1015, and a second adjuster 1017 for the differential amplifier 1015.

A current from the current booster 1019 is applied to the coil 1023 of the VCM 507, which in turn moves the actuation unit 109 based on the current.

The current booster 1019 adjusts the current to be applied to the coil 1023 and outputs the adjusted current to the resistor 1021. For example, the current booster 1019 adjusts the movement of the lens 107 by adjusting the current to be applied to the coil 1023 according to the moving voltage output from the fourth OP Amp 1009. The current booster 1019 includes first and second transistors and a driver. The transistors may be replaced with FETs.

The current output from the current booster 1019 flows through the resistor 1021, and the voltage across the resistor 1021 is output to an input of the differential amplifier 1015. The second adjuster 1017 for differential amplifier 1015 adjusts offset, gain, and voltage polarity of the differential amplifier 1015, and the differential amplifier 1015 amplifies the voltage applied across the resistor 1021 under the control of the second adjuster 1017 for differential amplifier 1015, and outputs the amplified voltage to an input of the third OP Amp 1011. As shown in FIG. 10 where the bidirectional current control scheme is employed, the voltage applied across the resistor 1021 has a polarity of either positive (+) or negative (−) depending on a current direction, and the differential amplifier 1015 is used to detect the polarity of the voltage applied across the resistor 1021. For example, the differential amplifier may be configured as shown in FIG. 9.

The first adjuster 1013 for the third OP Amp 1011 adjusts offset, gain, and polarity of the third OP Amp 1011. Under the control of the first adjuster 1013 for the third OP Amp 1011, the third OP Amp 1011 adjusts the voltage output from the differential amplifier 1015 to detect the interference voltage, and outputs the interference voltage to an input of the second OP Amp 1007. The interference voltage represents the voltage generated under the influence of the current applied to the VCM 507.

The hall sensor 1001 detects the amount of change in the magnetic lines of force generated by the magnet 101 as the hall voltage, and outputs the hall voltage to the first OP Amp 1003. The first OP Amp 1003 then amplifies the hall voltage output from the hall sensor 1001 according to a predetermined gain and outputs the amplified hall voltage to the second OP Amp 1007.

Then, the second OP Amp 1007 detects the interference-eliminated hall voltage based on the interference voltage output from the third OP Amp 1011 and the hall voltage output from the first OP Amp 1003, and outputs the interference-eliminated hall voltage to the fourth amplifier 1009. The interference-eliminated hall voltage refers to a voltage obtained by eliminating the influence of the current applied to the VCM 507 from the hall voltage.

The position controller 1005 outputs the control voltage to control the position of the lens 107 to the fourth OP Amp 1009. The fourth OP Amp 1009 then determines the moving voltage to move the lens 107 based on the interference-eliminated hall voltage output from the second OP Amp 1007 and the control voltage output from the position controller 1005, and outputs the moving voltage to the current booster 1019.

Again, the position controller 1005 receives the hall voltage output from the first OP Amp 1003 and the interference voltage output from the third OP Amp 1011, digitizes the hall voltage and the interference voltage with an ADC (not shown), and monitors values of the digitized hall voltage and interference voltage.

The position controller 1005 also stores the control voltage for the position of the actuation unit 109 in a memory (not shown), determines a control voltage for the moving distance based on the control voltage for the position of the actuation unit 109, and outputs the determined control voltage. For example, the position controller 1005 stores a table of initial voltages (e.g., represented by 'A' in FIG. 3) to move the actuation unit 109 and control voltages to move the actuation unit 109 up to predetermined distances, and determines one control voltage based on the table.

Figure 11:
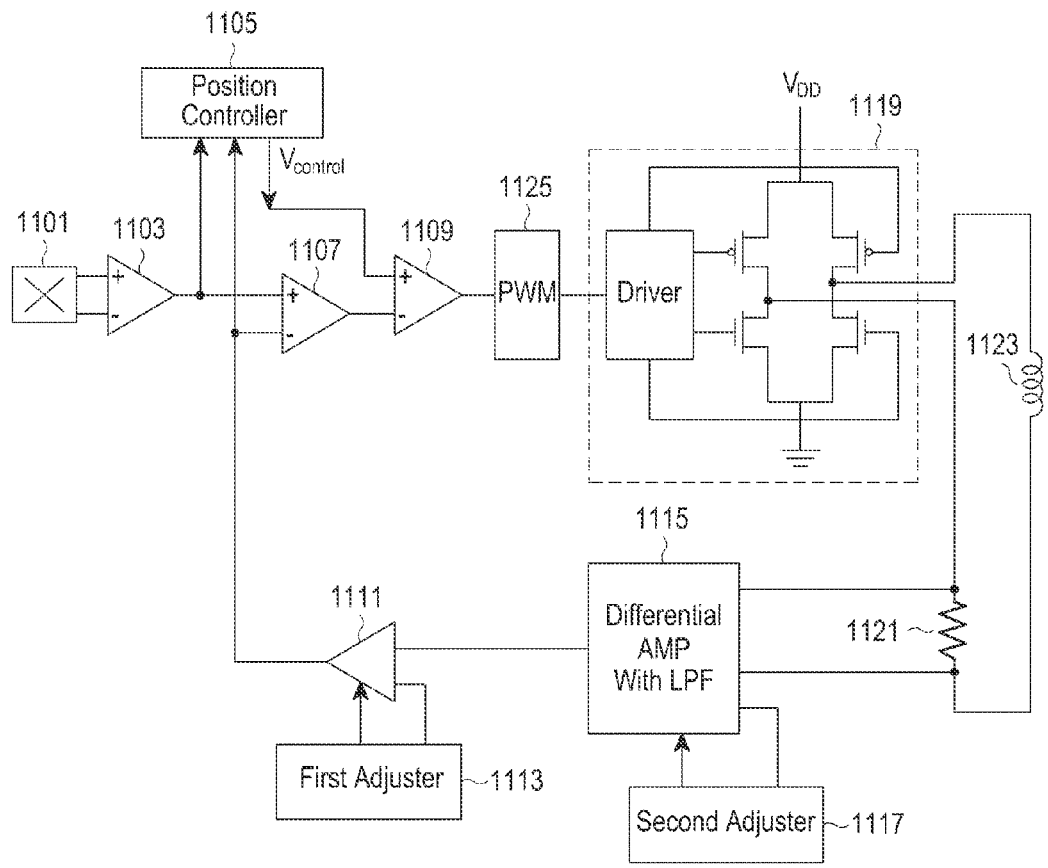
FIG. 11 is a circuit diagram of a current controller according to a fourth exemplary embodiment of the present invention.

FIG. 11 is a circuit diagram of a current controller according to a fourth exemplary embodiment of the present invention.

Referring to FIG. 11, the current controller 501 employs a +/− dual power source. Referring to FIG. 11, the current controller 501 includes a hall sensor 1101, a first OP Amp 1103, a position controller 1105, a second OP Amp 1107, a third OP Amp 1111, a first adjuster 1113 for the third OP Amp 1111, a fourth OP Amp 1109, a current booster 1119, a coil 1123 of the VCM 507, a resistor 1121, a differential amplifier 1115, and a second adjuster 1117 for the differential amplifier 1115, and a Pulse Width Modulation (PWM) modulator 1125.

A current from the current booster 1119 is applied to the coil 1123 of the VCM 507, which in turn moves the actuation unit 109 based on the current.

The current booster 1119 adjusts the current to be applied to the coil 1123 and outputs the adjusted current to the resistor 1121. For example, the current booster 1119 adjusts the movement of the lens 107 by adjusting the current to be applied to the coil 1123 according to the moving voltage output from the fourth OP Amp 1109. The current booster 1119 includes four FETs and a driver. On the other hand, the FETs may be substituted with other types of transistors.

The current output from the current booster 1119 flows through the resistor 1121, and the voltage across the resistor 1121 is output to an input of the differential amplifier 1115. The second adjuster 1117 for differential amplifier 1115 adjusts offset, gain, and voltage polarity of the differential amplifier 1115, and the differential amplifier 1115 amplifies the voltage applied across the resistor 1121 under the control of the second adjuster 1117 for differential amplifier 1115, and outputs the amplified voltage to an input of the third OP Amp 1111. As in FIG. 11 where the bidirectional current control scheme is employed, the voltage applied across the resistor 1121 has a polarity of either positive (+) or negative (−) depending on a current direction, and the differential amplifier 1115 is used to detect the polarity of the voltage applied across the resistor 1121.

The first adjuster 1113 for the third OP Amp 1111 adjusts offset, gain, and polarity of the third OP Amp 1111. Under the control of the first adjuster 1113 for the third OP Amp 1111, the third OP Amp 1111 adjusts the voltage output from the differential amplifier 1115 to detect the interference voltage, and outputs the interference voltage to an input of the second OP Amp 1107. The interference voltage represents the voltage generated under the influence of the current applied to the VCM 507.

The hall sensor 1101 detects the amount of change in the magnetic lines of force generated by the magnet 101 as the hall voltage, and outputs the hall voltage to the first OP Amp 1103. The first OP Amp 1103 then amplifies the hall voltage output from the hall sensor 1101 according to a predetermined gain and outputs the amplified hall voltage to the second OP Amp 1107.

Then, the second OP Amp 1107 detects the interference-eliminated hall voltage based on the interference voltage output from the third OP Amp 1111 and the hall voltage output from the first OP Amp 1103, and outputs the interference-eliminated hall voltage to the fourth amplifier 1109. The interference-eliminated hall voltage refers to a voltage obtained by eliminating the influence of the current applied to the VCM 507 from the hall voltage.

The position controller 1105 outputs the control voltage to control the position of the lens 107 to the fourth OP Amp 1109. The fourth OP Amp 1109 then determines the moving voltage to move the lens 107 based on the interference-eliminated hall voltage output from the second OP Amp 1107 and the control voltage output from the position controller 1105, and outputs the determined moving voltage to the PWM modulator 1125.

The PWM modulator 1125 adjusts the amplitude of the moving voltage output from the fourth OP Amp 1109 and outputs the amplitude adjusted moving voltage to the current booster 1119. As such, in the current controller 501 using the PWM modulator 1125, when the PWM frequency is in the range of 4-20 kHz, the VCM 507 generates an audible sound. In this regard, the VCM has a large inductance and thus is unfavorable to high frequency operation. Accordingly, an appropriate operating frequency of the PWM modulator 1125 should be chosen.

Again, the position controller 1105 receives the hall voltage output from the first OP Amp 1103 and the interference voltage output from the third OP Amp 1111, digitizes the received hall voltage and the interference voltage with an ADC (not shown), and monitors values of the digitized hall voltage and interference voltage.

The position controller 1105 also stores the control voltage for the position of the actuation unit 109 in a memory (not shown), determines a control voltage for the moving distance based on the control voltage for the position of the actuation unit 109, and outputs the determined control voltage. For example, the position controller 1105 stores a table of initial voltages (e.g., represented by 'A' in FIG. 3) to move the actuation unit 109 and control voltages to move the actuation unit 109 up to predetermined distances, and determines one control voltage based on the table.

Figure 12:
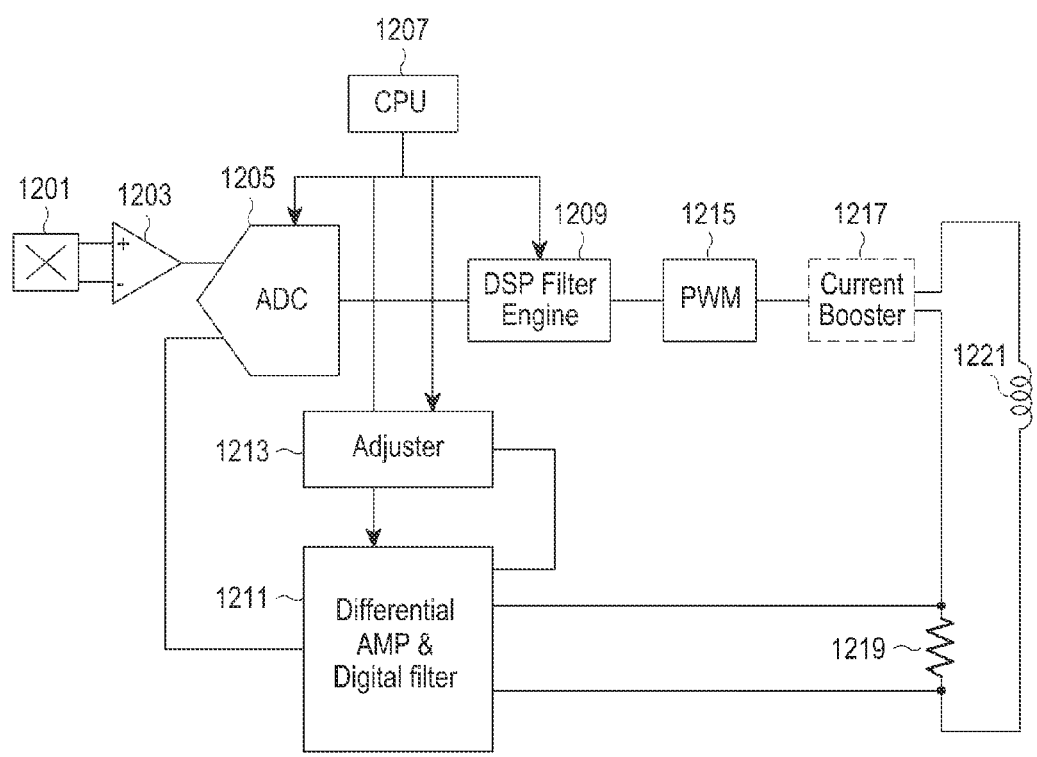
FIG. 12 is a circuit diagram of a current controller according to a fifth exemplary embodiment of the present invention.

FIG. 12 is a circuit diagram of a current controller according to a fifth exemplary embodiment of the present invention.

Referring to FIG. 12, a digital controlling scheme is applied to the current controller 501 in a case where the current controller 501 uses the +/− dual power source. Referring to FIG. 12, the current controller 501 includes a hall sensor 1201, a first OP Amp 1203, an ADC 1205, a position controller (e.g., a Central Processing Unit (CPU)) 1207, a Digital Signal Processor (DSP) filter engine 1209, a differential amplifier 1211, an adjuster 1213 for the differential amplifier 1211, a PWM modulator 1215, a current booster 1217, a coil 1221 of the VCM 507, and a resistor 1219.

A current from the current booster 1217 is applied to the coil 1221 of the VCM 507, which in turn moves the actuation unit 109 based on the current. The current booster 1217 adjusts the current to be applied to the coil 1221 and outputs the adjusted current to the resistor 1219. For example, the current booster 1217 adjusts the movement of the actuation unit 109 by adjusting the current to be applied to the coil 1221 according to the voltage output from the PWM modulator 1215.

The current booster 1217 includes four FETs and a driver. On the other hand, the FETs may be substituted with other types of transistors.

The voltage across the resistor 1219 is output to an input of the differential amplifier 1211. The adjuster 1213 for the differential amplifier 1211 adjusts offset, gain, and voltage polarity of the differential amplifier 1211 under the control of the position controller (e.g., CPU) 1207, and the differential amplifier 1211 amplifies the voltage applied across the resistor 1219 under the control of the adjuster 1213 for differential amplifier 1211, and outputs the amplified voltage to an input of the ADC 1205. As shown in FIG. 12 where the bidirectional current control scheme is employed, the voltage applied across the resistor 1219 has a polarity of either positive (+) or negative (−) depending on a current direction, and the differential amplifier 1211 is used to detect the polarity of the voltage applied across the resistor 1219.

The hall sensor 1201 detects the amount of change in the magnetic lines of force generated by the magnet 101 as the hall voltage, and outputs the detected hall voltage to the first OP Amp 1203. The first OP Amp 1203 then amplifies the hall voltage output from the hall sensor 1201 according to a predetermined gain and outputs the amplified hall voltage to another input of ADC 1205.

The ADC 1205 converts the amplified hall voltage output from the first OP Amp 1203 and outputs the converted hall voltage to the DSP filter engine 1209. Furthermore, the ADC 1205 converts the voltage output from the differential amplifier 1211 and outputs the converted voltage to the DSP filter engine 1209.

Then, the DSP filter engine 1209 generates the moving voltage by digital-processing the hall voltage output from the ADC 1205 and the voltage output from the differential amplifier 1211, under the control of the position controller (e.g., CPU) 1207, and outputs the moving voltage to the PWM modulator 1215. The PWM modulator 1215 adjusts the amplitude of the moving voltage output from the DSP filter engine 1209 and outputs the amplitude adjusted moving voltage to the current booster 1217. As such, in the current controller 501 using the PWM modulator 1215, when the PWM frequency is in the range of 4-20 kHz, the VCM 507 generates an audible sound. In this regard, the VCM has a large that is inductance unfavorable to high frequency operation. Accordingly, an appropriate operating frequency of the PWM modulator 1215 should be selected.

With the foregoing operations, the exemplary embodiments of the present invention has an effect of precisely controlling the camera module by removing the voltage generated under the influence of the current applied to the VCM from the hall voltage detected by the hall sensor.

Several exemplary embodiments have been described in connection with e.g., mobile communication terminals, but it will be understood that various modifications can be made without departing the scope of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling an actuator in a camera module, the apparatus comprising:
   a position controller configured to produce a control voltage to move a lens of the camera module;
   a hall sensor configured to detect an amount of change in magnetic lines of force generated by a magnet to output a hall voltage;
   a voice coil motor configured to move the lens according to a current applied thereto; and
   a current controller comprising at least one operational amplifier (OP Amp) and a current booster, the current controller being configured to:
      detect an interference voltage that is generated under the influence of the current applied to the voice coil motor, based on a voltage across a resistor that is connected to the voice coil motor through the current booster, the voltage across the resistor corresponding to the current applied to the voice coil motor,
      generate an interference-eliminated hall voltage by removing the detected interference voltage from the hall voltage,
      output a moving voltage, which is generated based on the control voltage and the interference-eliminated hall voltage, to the current booster, and
      control, through the current booster, the current applied to the voice coil motor based on the moving voltage,
   wherein the at least one OP Amp is input with the hall voltage in a first terminal and input with the interference voltage in a second terminal to generate the interference-eliminated hall voltage, and
   wherein the current booster applies the current to the voice coil motor, based on the moving voltage.

2. The apparatus of claim 1,
   wherein the resistor is configured to convert the current applied to the voice coil motor into a converted voltage, and
   wherein the at least one OP Amp comprises:
      a first operational amplifier (OP Amp) configured to detect the interference voltage generated under an influence of the current applied to the voice coil motor based on the converted voltage;
      a second OP Amp configured to generate the interference-eliminated hall voltage by removing the detected interference voltage from the hall voltage; and
      a third OP Amp configured to generate the moving voltage to control the current applied to the voice coil motor based on the interference-eliminated hall voltage and the control voltage.

3. The apparatus of claim 1,
wherein the resistor is configured to convert the current applied to the voice coil motor into a converted voltage across the resistor, and
wherein the at least one OP Amp comprises:
- a differential amplifier configured to detect the converted voltage across the resistor;
- a first operational amplifier (OP Amp) configured to detect the interference voltage generated under an influence of the current applied to the voice coil motor based on the detected voltage;
- a second OP Amp configured to generate the interference-eliminated hall voltage by removing the detected interference voltage from the hall voltage; and
- a third OP Amp configured to generate the moving voltage to control the current applied to the voice coil motor based on the interference-eliminated hall voltage and the control voltage.

4. The apparatus of claim 3, wherein the differential amplifier is further configured to detect a polarity of the converted voltage across the resistor.

5. The apparatus of claim 1,
wherein the resistor is configured to convert the current applied to the voice coil motor into a converted voltage across the resistor, and
wherein the at least one OP Amp comprises:
- a differential amplifier configured to detect the converted voltage across the resistor;
- a first operational amplifier (OP Amp) configured to detect the interference voltage generated under an influence of the current applied to the voice coil motor based on the detected voltage;
- a second OP Amp configured to generate the interference-eliminated hall voltage by removing the detected interference voltage from the hall voltage;
- a third OP Amp configured to generate the moving voltage to control the current applied to the voice coil motor based on the interference-eliminated hall voltage and the control voltage; and
- a pulse width modulation (PWM) modulator configured to module an amplitude of the moving voltage.

6. The apparatus of claim 5, wherein the differential amplifier is further configured to detect a polarity of the voltage across the resistor.

7. The apparatus of claim 1,
wherein the resistor is configured to convert the current applied to the voice coil motor into a converted voltage across the resistor, and
wherein the at least one OP Amp comprises:
- a differential amplifier configured to detect the converted voltage across the resistor;
- an analog-to-digital converter (ADC) configured to:
  convert the detected voltage across the resistor and the hall voltage to digital signals, respectively, and output the converted detected voltage across the resistor and the converted hall voltage; and
- a digital signal processing (DSP) filter engine configured to generate the moving voltage to control the current applied to the voice coil motor based on the converted detected voltage across the resistor and the converted hall voltage.

8. The apparatus of claim 7, wherein the differential amplifier is further configured to detect a polarity of the converted detected voltage across the resistor.

9. The apparatus of claim 1, wherein the position controller is further configured to produce the control voltage to move the lens of the camera module based on a table of:
- initial voltages to move the lens of the camera module; and
- control voltages to move the lens of the camera module up to predetermined distances.

10. A method for controlling an actuator in a camera module, the method comprising:
- producing a control voltage to move a lens of the camera module;
- detecting, by a hall sensor, an amount of change in magnetic lines of force generated by a magnet to output a hall voltage;
- detecting, by a current controller including at least one operational amplifier and a current booster, an interference voltage that is generated under the influence of a current applied to a voice coil motor, based on a voltage across a resistor that is connected to the voice coil motor through the current booster, the voltage across the resistor corresponding to the current applied to the voice coil motor;
- generating, by the current controller, an interference-eliminated hall voltage by removing the detected interference voltage from the hall voltage;
- outputting, by the current controller, a moving voltage, which is generated based on the control voltage and the interference-eliminated hall voltage, to the current booster;
- based on the control voltage and the interference-eliminated hall voltage, controlling the current applied to the voice coil motor by using the current booster; and
- moving the lens according to the current applied to the voice coil motor,
wherein the at least one operational amplifier is input with the hall voltage in a first terminal and input with the interference voltage in a second terminal to generate the interference-eliminated hall voltage, and
wherein the current booster applies the current to the voice coil motor, based on the moving voltage.

11. The method of claim 10, wherein the controlling of the current further comprises:
- converting the current applied to the voice coil motor into a converted voltage;
- detecting the interference voltage generated under an influence of the current applied to the voice coil motor based on the converted voltage;
- generating the interference-eliminated hall voltage by removing the detected interference voltage from the hall voltage;
- generating the moving voltage to control the current applied to the voice coil motor based on the interference-eliminated hall voltage and the control voltage; and
- applying the current to the voice coil motor according to the moving voltage.

12. The method of claim 10, wherein the controlling of the current comprises:
- detecting a voltage applied across the resistor;
- detecting the interference voltage generated under an influence of the current applied to the voice coil motor based on the detected voltage applied across the resistor;
- generating the interference-eliminated hall voltage by removing the detected interference voltage from the hall voltage;

generating the moving voltage to control the current applied to the voice coil motor based on the interference-eliminated hall voltage and the control voltage; and applying the current to the voice coil motor according to the moving voltage.

13. The method of claim 12, wherein the detecting of the voltage applied across the resistor comprises detecting a polarity of the voltage applied across the resistor.

14. The method of claim 10, wherein the controlling of the current further comprises:

detecting the voltage applied across the resistor;

detecting the interference voltage generated under an influence of the current applied to the voice coil motor based on the detected voltage;

generating the interference-eliminated hall voltage by removing the detected interference voltage from the hall voltage;

generating the moving voltage to control the current applied to the voice coil motor based on the interference-eliminated hall voltage and the control voltage;

modulating an amplitude of the moving voltage; and applying the current to the voice coil motor according to the modulated moving voltage.

15. The method of claim 14, wherein the detecting of the voltage applied across the resistor comprises detecting a polarity of the voltage applied across the resistor.

16. The method of claim 10, wherein the controlling of the current comprises:

detecting the voltage applied across the resistor;

converting the detected voltage applied across the resistor and the hall voltage into digital signals, respectively;

outputting the converted detected voltage applied across the resistor and the converted hall voltage;

generating the moving voltage to control the current applied to the voice coil motor based on the converted detected voltage applied across the resistor and the converted hall voltage; and applying the current to the voice coil motor according to the moving voltage.

17. The method of claim 16, wherein the detecting of the voltage applied across the resistor comprises detecting a polarity of the voltage applied across the resistor.

18. The method of claim 10, wherein the control voltage to move the lens of the camera module is produced based on a table of:

initial voltages to move the lens of the camera module; and control voltages to move the lens of the camera module up to predetermined distances.

* * * * *